United States Patent Office 3,322,811
Patented May 30, 1967

3,322,811
DITHIO OXAMYL CHLORIDES
Paul J. Stoffel, St. Louis, Mo., assignor to Monsanto Company, St. Louis, Mo., a corporation of Delaware
No Drawing. Filed Sept. 23, 1963, Ser. No. 310,855
20 Claims. (Cl. 260—455)

This invention relates to a novel process and to useful compounds prepared thereby. More particularly, the compounds are useful in controlling harmful microorganisms such as fungi, insects and other harmful microorganisms. These novel compounds are useful as intermediates in the preparation of the compounds described and claimed in copending application Ser. No. 351,850, filed by Paul J. Stoffel on Mar. 13, 1964.

This new group of compounds is prepared in accordance with the reaction:

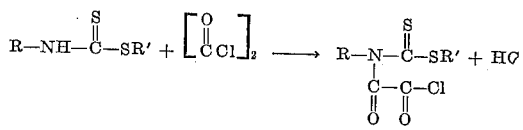

wherein R and R' are each selected from the group consisting of hydrocarbon radicals selected from the class consisting of alkyl having up to 12 carbon atoms, alkenyl having up to 12 carbon atoms, cycloalkyl having up to 8 carbon atoms, phenyl and benzyl; and the said hydrocarbon radicals having up to four substituents selected from the class consisting of chlorine, bromine, nitro, alkyl having up to four carbon atoms, alkoxy having up to four carbon atoms and phenyl.

The above described novel procedure involves contacting oxalyl chloride with esters of dithiocarbamic acid. Both the substituents on the nitrogen and the esterifying group may vary in the manner described above. Although the reaction may be conducted by mere physical contact with the reactants, such procedure often results in an incomplete reaction or in an uncontrolled reaction. Preferred practice involves the contact of the reagents in a solvent medium. This procedure permits a less vigorous reaction and ultimately a more complete reaction by reason of the uniform nature of the reaction mixture. An essential aspect of this invention is the maintenance of a moderate temperature, for example 30 to 140° C. Above 140° C. a quite different cyclic structure is formed. In order to accomplish significant yields of the compounds claimed herein, temperatures from 30 to 80° should be used. The lower temperatures are also preferred in order to facilitate the control of the reaction which evolves hydrogen chloride, which evolution will be quite vigorous at higher temperatures or in the absence of a suitable co-solvent for the reagents. The preferred practice involves the dissolution of one of the reactants in the solvent medium and thereafter gradually introducing the second reactant to the solution. If desired, both reactants can be introduced to the solvent under conditions which permit little or no initial reaction. Such mixtures are then heated to temperatures which will promote a more rapid rate of reaction, for example 60 to 100° C. The novel compounds will also be prepared from temperatures up to 140° C. but lower yields are obtained when the temperature exceeds 100° C.

The solvent used as the reaction medium may be any solvent for the reactants which is inert under the conditions of reaction. Suitable solvents of this type are the aromatic hydrocarbons and the halogen substituted aromatic hydrocarbons, for example benzene, toluene, xylene, chlorotoluene, bromobenzene, 1,4-dichlorobenzene and other aromatic and halogen substituted aromatic hydrocarbons. Since it is desirable to conduct the reaction at least to a larger portion of the reaction period at temperatures within the range of 30 to 140° C., it is generally desirable to select the solvent so that the reaction mixture can be refluxed within the said desirable temperature range.

Since several of the above derived solvents useful as reaction media reflux at temperatures in excess of those desired to produce the reaction, that is above 140° C., it may be desirable to select a solvent which does reflux within the desired temperature range or to conduct the reaction at reduced pressures in order that a reflux will take place below the normal boiling point of the solvent.

Since hydrogen chloride as evolved in the course of the reaction the progress of the reaction may be followed by the evolution of this gas. When the reaction has been completed to the desired extent, the product may be precipitated upon cooling of the reaction mixture. Under some circumstances, the product may remain dissolved in the reaction medium and in such cases precipitation may be induced by introducing a non-solvent to the product which is miscible with the solvent medium. Solvents of this type are the aliphatic petroleum fractions such as n-hexane, kerosene or gasoline. The solid product so obtained is separated from the reaction solvents by filtration and may be purified by recrystallization in a suitable solvent, for example acetone and benzene.

Further details of the preparation and properties of the new compounds are set forth in the following examples.

EXAMPLE 1

A benzene solution of equimols of methyl 3,4-dichlorodithiocarbanilate and oxalyl chloride was prepared and heated at reflux for 24 hours. HCl was evolved and when the reaction subsided a vacuum was applied to evaporate a substantial portion of the benzene reaction medium. Upon cooling the product crystallized. The crystals were recrystallized from benzene solution and the product identified as having the structure:

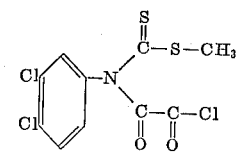

EXAMPLE 2

Using the procedure of Example 1 except that isopropyl 3,4-dichlorodithiocarbanilate was used in place of the methyl ester, a product of the following structure was formed:

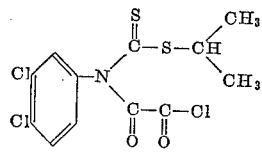

EXAMPLE 3

In another preparation methyl N-cyclohexyldithiocarbamate was reacted with oxalyl chloride as temperatures between 70 and 80° C. The compound was identified as having the following structure:

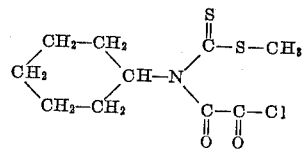

EXAMPLE 4

The reaction of oxalyl chloride and benzyl p-methoxydithiocarbanilate was conducted in a toluene solution using a pressure so that reflux took place at about 80° C. When the evolution of hydrogen chloride had subsided the reaction mixture was cooled and the precipitated product recrystallized and identified as having the structure:

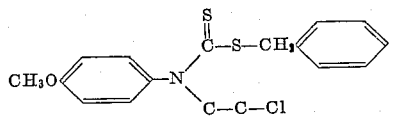

EXAMPLE 5

Using the procedure above described oxalyl chloride and phenyl p-nitrodithiocarbanilate were reacted by heating at the benzene reflux temperature. The product so formed was identified as that having the structure:

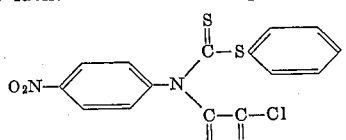

EXAMPLE 6

Using the procedure of Example 1 oxalyl chloride and allyl N-allyldithiocarbamate were reacted to form a compound of the structure:

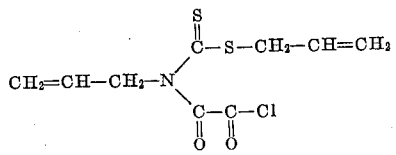

EXAMPLE 7

The reaction of p-chlorobenzyl N-methyldithiocarbamate and oxalyl chloride was conducted in a benzene solution at reflux temperature. The product obtained by precipitation in the manner above described was identified as that having the structure:

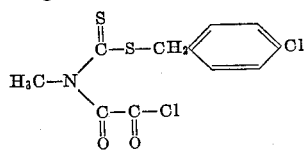

EXAMPLE 8

The reaction of oxalyl chloride and a methyl N-dodecyldithiocarbamate were added at reflux in a xylene solution at reduced pressure so as to reflux at 90 to 100° C. Upon the completion of the reaction, the product was precipitated and found to have the structure:

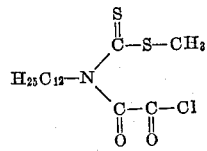

EXAMPLE 9

The reaction between oxalyl chloride and methyl p-nitrodithiocarbanilate produced a compound of the structure:

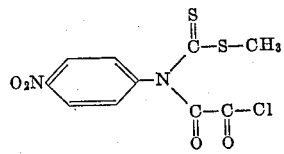

EXAMPLE 10

The reaction in accordance with the procedure of Example 1 between oxalyl chloride and cyclohexyl N-(2-ethyl)hexyldithiocarbamate in a benzene medium produced a compound of the structure:

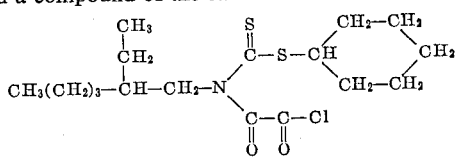

Although the invention is described with respect to specific modifications, it is not intended that the details thereof are limitations on the scope of the invention except to the extent incorporated in the following claims.

What is claimed is:

1. A compound of the structure

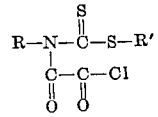

wherein R and R' are each selected from the group consisting of
 (A) aliphatic hydrocarbon and substituted aliphatic hydrocarbon having up to four substituents wherein the aliphatic hydrocarbon is selected from the group consisting of alkyl of not more than 12 carbon atoms, alkenyl of not more than 12 carbon atoms, cycloalkyl having at least 4 and not more than 8 carbon atoms, wherein the substituents on the aliphatic hydrocarbon are selected from the group consisting of chlorine, bromine, nitro, and alkoxy of not more than four carbon atoms, and
 (B) aromatic hydrocarbon and substituted aromatic hydrocarbon having up to four substituents wherein the aromatic hydrocarbon is selected from the group consisting of phenyl and benzyl and wherein the substituents on the aromatic hydrocarbon are selected from the group consisting of chlorine, bromine, nitro, alkyl of not more than four carbon atoms and alkoxy of not more than four carbon atoms.

2. A compound of the structure:

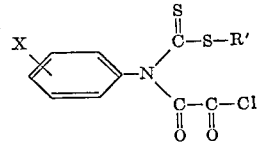

wherein X is a halogen atom of the class consisting of bromine and chlorine and wherein R' is an alkyl radical having up to 12 carbon atoms.

3. A compound of the structure:

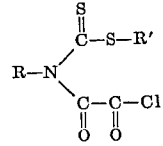

wherein R is a cycloalkyl radical having from 4 to 8 carbon atoms and wherein R' is an alkyl radical having up to 12 carbon atoms.

4. A compound of the structure:

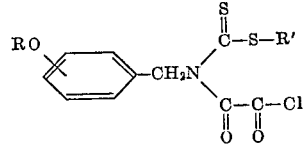

wherein R is an alkyl radical having up to four carbon atoms and wherein R' is an alkyl radical of up to 12 carbon atoms.

5. A compound of the structure:

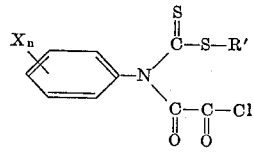

wherein R' is a cycloalkyl radical having from 4 to 8 carbon atoms; wherein X is a halogen atom of the class consisting of bromine and chlorine; and wherein $n$ is an integer from 0 to 2.

6. A compound of the structure:

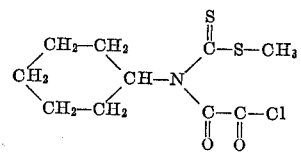

7. A compound of the structure:

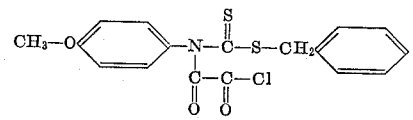

8. A compound of the structure:

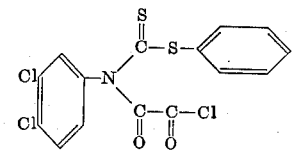

9. A compound of the structure:

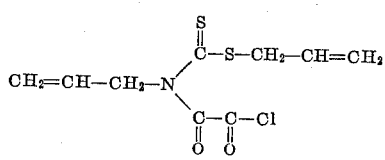

10. A compound of the structure:

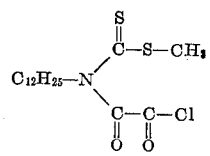

11. The method of preparing a compound of the structure:

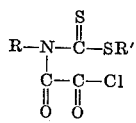

which comprises contacting at a temperature between 30° C. and 100° C. oxalyl chloride and a compound of the structure:

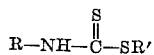

wherein R and R' are each selected from the group consisting of (A) aliphatic hydrocarbon and substituted aliphatic hydrocarbon having up to four substituents wherein the aliphatic hydrocarbon is selected from the group consisting of alkyl of not more than 12 carbon atoms, alkenyl of not more than 12 carbon atoms, cycloalkyl having at least 4 and not more than 8 carbon atoms, wherein the substituents on the aliphatic hydrocarbon are selected from the group consisting of chlorine, bromine, nitro, and alkoxy of not more than four carbon atoms, and (B) aromatic hydrocarbon and substituted aromatic hydrocarbon having up to four substituents wherein the aromatic hydrocarbon is selected from the group consisting of phenyl and benzyl and wherein the substituents on the aromatic hydrocarbon are selected from the group consisting of chlorine, bromine, nitro, alkyl of not more than four carbon atoms and alkoxy of not more than four carbon atoms.

12. The method of preparing a compound of the structure:

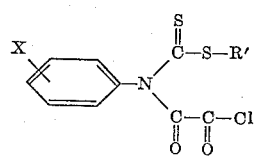

wherein X is a halogen atom of the class consisting of bromine and chlorine and wherein R' is an alkyl radical having up to 12 carbon atoms which comprises heating at a temperature between about 30° C. and about 140° C. oxalyl chloride and a dithiocarbamate of the structure

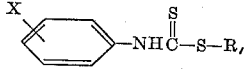

13. The method of preparing a compound of the structure:

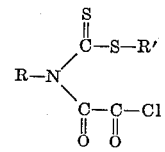

wherein R is a cycloalkyl radical having from 4 to 8 carbon atoms and wherein R' is an alkyl radical having up to 12 carbon carbon atoms which comprises heating at a temperature between about 30° C. and about 140° C. oxalyl chloride with a dithiocarbamate of the structure:

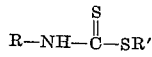

14. The method of preparing a compound of the structure:

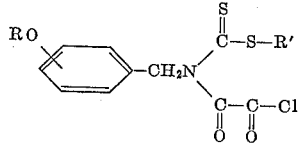

wherein R is an alkyl radical having up to four carbon atoms and wherein R' is an alkyl radical of up to 12 carbon atoms which comprises heating at a temperature between about 30° C. and about 140° C. oxalyl chloride with a carbanilate of the structure:

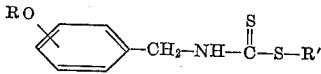

15. The method of preparing a compound of the structure:

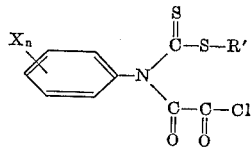

wherein R' is a cycloalkyl radical having from 4 to 8 carbon atoms; wherein X is a halogen atom of the class consisting of bromine and chlorine; and wherein $n$ is an integer from 0 to 2; which comprises heating at a temperature between about 30° C. and about 140° C. oxalyl chloride with a carbanilate of the structure:

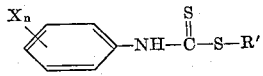

16. The method of preparing a compound of the structure:

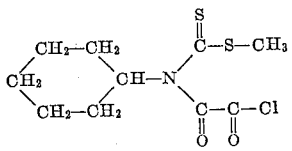

which comprises heating methyl N-cyclohexyldithiocarbamate and oxalyl chloride in an inert aromatic solvent at reflux temperatures below 100° C.

17. The method of preparing a compound of the structure:

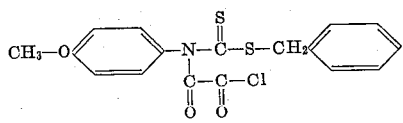

which comprises heating benzyl methoxydithiocarbanilate and oxalyl chloride in an inert aromatic solvent at reflux temperatures below 100° C.

18. The method of preparing a compound of the structure:

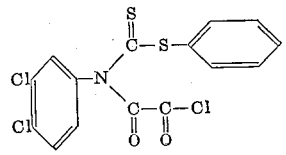

which comprises heating oxalyl chloride and phenyl 3,4-dichlorodithiocarbanilate at reflux temperatures below 100° C.

19. The method of preparing a compound of the structure:

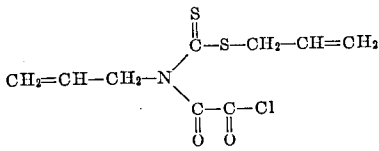

which comprises heating oxalyl chloride and allyl N-allyldithiocarbamate in an inert aromatic solvent at reflux temperatures below 100° C.

20. The method of preparing a compound of the structure:

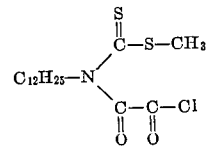

which comprises heating oxalyl chloride and methyl N-dodecyldithiocarbamate in an inert aromatic solvent at reflux temperatures below 100° C.

References Cited

Bornwater Recueil Travaux Chimiques Des Pays-Bas, 1912, Tome 31, pp. 105–141 (p. 109 is relied on).

CHARLES B. PARKER, *Primary Examiner.*

JOSEPH P. BRUST, *Examiner.*

DALE R. MAHANAND, DELBERT R. PHILLIPS,
*Assistant Examiners.*